Nov. 16, 1937. W. K. SCHAUWEKER 2,099,234
CHECK AND CHECK CONTROLLED MECHANISM
Filed Feb. 18, 1936 3 Sheets-Sheet 3
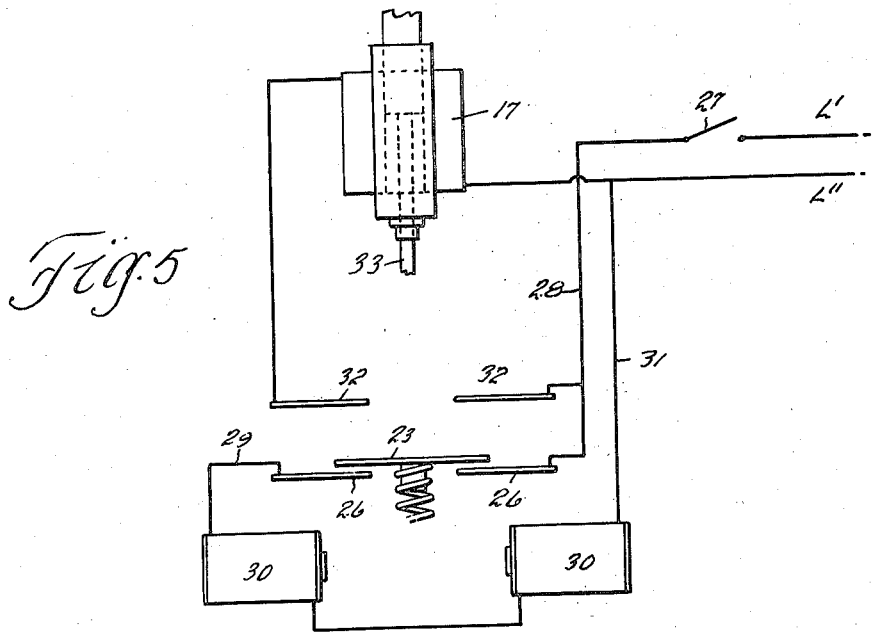
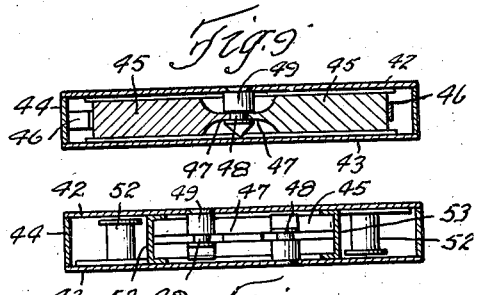
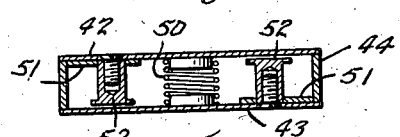
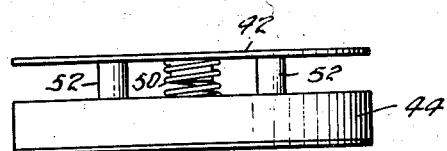
INVENTOR.
W. K. Schauweker
BY
ATTORNEY.

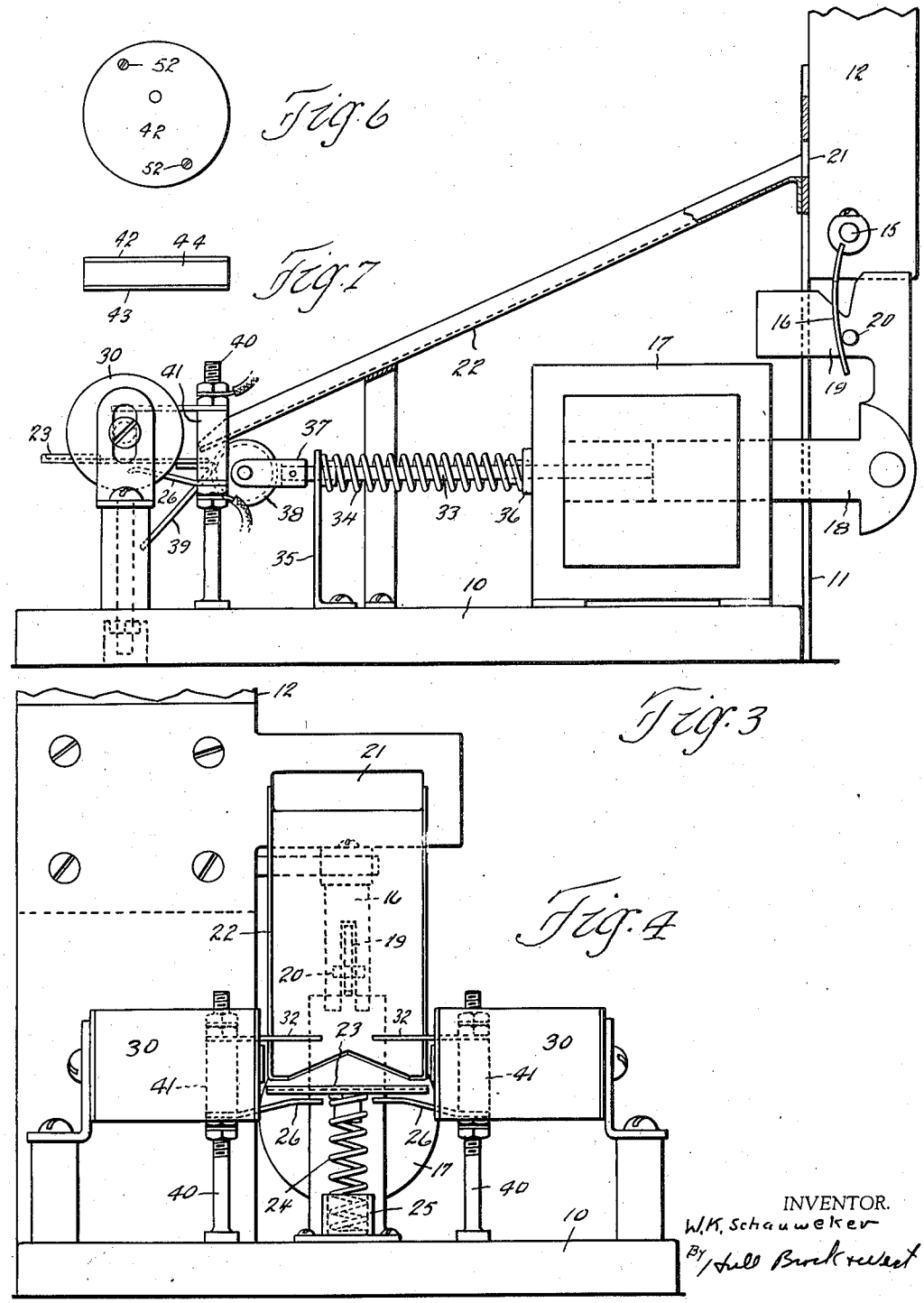

Patented Nov. 16, 1937

2,099,234

UNITED STATES PATENT OFFICE 2,099,234

CHECK AND CHECK CONTROLLED MECHANISM

William K. Schauweker, Cleveland, Ohio

Application February 18, 1936, Serial No. 64,548

8 Claims. (Cl. 194—4)

This invention relates to check controlled mechanism and checks for operating the same. I will describe my invention as applied to a vending machine but it is to be understood that it is equally applicable to other check controlled mechanisms, such as telephones, weighing machines and the like.

An object of the invention is to provide against operation of the check controlled device by counterfeit checks by employing a check requiring the use of expensive machinery to construct and which cannot be cheaply produced. While such a plan for the prevention of unauthorized operation of the machine may not be universally practical, it is believed that it will be quite practical in "Automat" stores and in general in places where it is practicable to have a cashier present to sell the checks and to redeem unused checks.

A further object of the invention is to provide for securing the above indicated result by the use of a mechanical check having relatively movable parts in combination with a check controlled machine adapted to receive such check and to cause relative motion of its parts and then to respond to such relative motion to become operative to deliver merchandise or otherwise become effective for its intended purpose.

A more specific object is to provide an expansible check as well as a machine capable of causing such check to expand and to respond to such expansion to become effective for its intended purpose.

Figure 1:
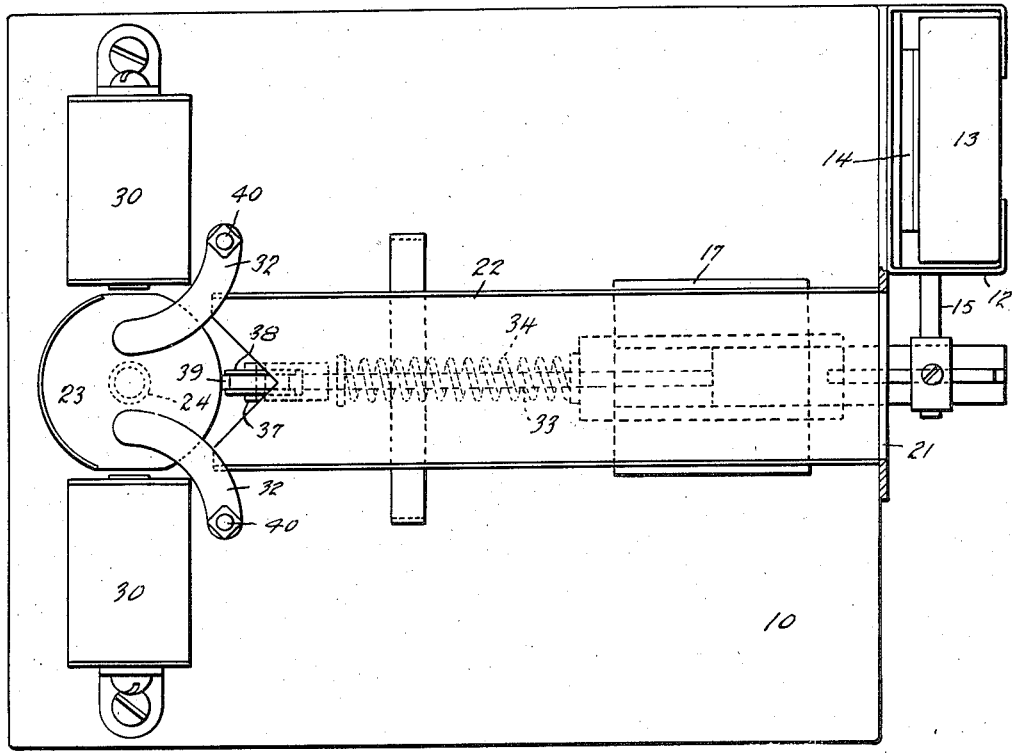
Figure 2:
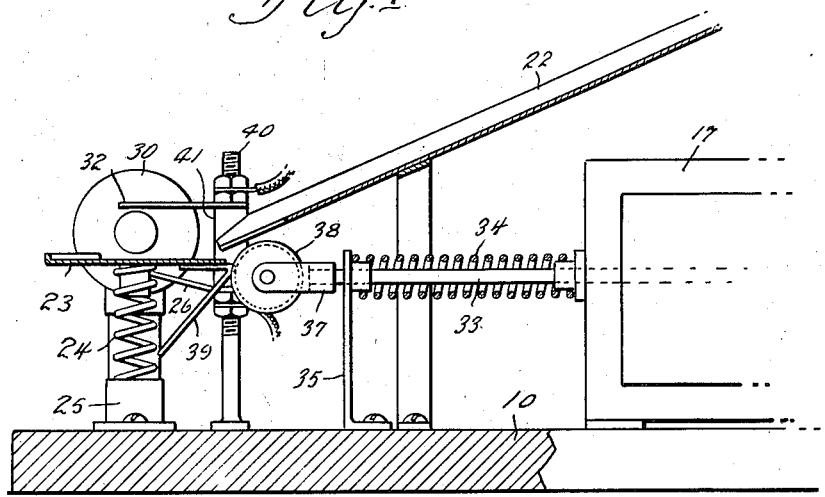

Other and more limited objects will become apparent as the description proceeds. Fig. 1 is a plan view partly in section of a check controlled machine partially embodying the invention; Fig. 2 is a sectional view partly in elevation showing the mechanism at the left hand end of Fig. 1; Fig. 3 is a fragmentary elevation of the mechanism shown in Fig. 1; Fig. 4 is a fragmentary front view of the mechanism shown in Fig. 1; Fig. 5 is a wiring diagram showing the electric circuits involved in the operation of the mechanism of Figs. 1 to 4; Figs. 6 and 7 are plan and elevational views of an expansible check adapted to cooperate with the machine disclosed in Figs. 1 to 5; Fig. 8 is a plan section of the check of Figs. 6 and 7; Figs. 9, 10, and 11 are sections on the lines 9—9, 10—10 and 11—11, respectively, of Fig. 8; and Fig. 12 is an elevation of the check corresponding to Fig. 7, but shown in expanded condition.

Referring first to the check receiving mechanism shown in Figs. 1 to 5, the numeral 10 indicates a base which may form a portion of or be received together with the mechanism within a suitable housing not shown. Suitably mounted on the base 10 as on an upright 11 is a magazine 12 adapted to receive merchandise 13 to be dispensed. Merchandise may be released by any suitable release mechanism, as for example, a curved element 14 carried by an oscillatable shaft 15 and adapted, upon oscillation of an arm 16 carried by the shaft 15, to be moved from below the lowermost article and projected into the space between the same and the next succeeding article. This is a common type of release mechanism and need not be described in detail. For the purpose of operating the arm 16, I provide a solenoid 17 by the plunger 18 of which is carried a plate 19 having thereon a projecting pin 20 adapted to engage the arm 16 upon energization of the solenoid.

At one side of the magazine 12 is a check slot 21 adapted to receive the check of Figs. 6 and 7. Extending downwardly from the slot 21 is a chute 22 adapted to deliver the check upon a platform 23. The platform 23 is supported upon a spring 24 affixed to the base 10 by a suitable socket 25. Immediately beneath the platform 23 and positioned quite close to the same are resilient contacts 26. These contacts are positioned sufficiently close to the platform 23 that the weight of the check will depress such platform against the resistance of the spring 24 enough to make contact between the elements 26. Such contact completes the circuit from line L' through a switch 27 and conductor 28 through elements 26 and 23 and conductor 29 to the magnets 30 in series and conductor 31 to L".

When this circuit is complete the magnets 30 will operate to cause expansion of the check, as will be described. When the check expands the upper surface thereof will bridge the contacts 32 whereby to complete a circuit from L', through switch 27, conductor 28, contact elements 32 and solenoid 17 back to L", whereupon the plunger 18 will be moved to the left.

Plunger 18 carries a plunger rod 33 around which is a compression spring 34 which will restore the plunger to the position of Fig. 3 when the solenoid 17 is de-energized. The spring 34 is held at the left hand end against the action of the plunger rod by a suitable bracket 35. A suitable collar 36 on the plunger rod 33 may receive the other end of the spring 34. The plunger rod 33 carries at its left hand end by means of a suitable bifurcated element 37 a roller 38 which has a grooved periphery adapted to receive an angularly downwardly extending element 39.

Upon actuation of the solenoid, the platform 23 will be tipped over toward the left to dump the check. This will result in breaking the circuit between the elements 32 whereupon the spring 34 will restore the mechanism to the original condition shown in the drawings. The contact elements 26 and 32 may be suitably mounted on upstanding posts 40 composed of electrically non-conductive material and separated from each other by sleeves 41 also of insulating material.

The check may consist of upper and lower plates 42 and 43, either of which may be the upper, and a cylindrical shell portion 44 together with the internal mechanism carried by these elements. Movable within the enclosure defined by the elements 42, 43 and 44 are blocks 45 of magnetic material, which preferably constitutes the sole magnetic portion of the check. These blocks are urged to central blocking position shown in Fig. 8 by springs 46 carried by the element 44. These blocks have reduced inner ends 47 adapted to engage in grooves 48 in elements 49 one of which is carried by each of the plates 42 and 43, as shown in Fig. 10. From this it will be clear that when the blocks 45 are separated, both the plates 42 and 43 will be released and may separate under the action of springs 50. Limiting means are provided for limiting the amount of separation of the plates 42 and 43. Such means may take the form of inturned portions 51 carried by the elements 44 and receiving headed members 52 as best seen in Fig. 11.

It will be understood that a section taken through the lower elements 52 would be similar to Fig. 11 except that it would indicate that diagonally opposed headed members are carried by the plate 42 and the other pair of diagonally opposed headed members are carried by the plate 43. Suitable guide means 53 carried by the element 44 may be provided for holding the blocks 45 in properly assembled relation. The spring 50 may have such expansive properties that the weight of the blocks 45 will cause the check when in expanded position to present substantially the appearance of Fig. 12. After the check has been dumped from the platform 23 it may be recovered from the machine, again compressed and sold for repeated use.

While I have shown and described the preferred embodiment of my invention, I wish it understood that it may be realized in numerous other embodiments and that I am limited only in accordance with the appended claims and the prior art.

Having thus described my invention, what I claim is:

1. As a new article of manufacture, a check, the same comprising a plurality of parts and means tending to cause separation of such parts, said check including means for normally holding such parts in contracted relation, means for limiting such separation of said parts and means responsive to an external magnetic influence for releasing said holding means.

2. In combination, a mechanical check comprising a plurality of relatively movable parts, means tending to cause separation of such parts, means for normally holding said parts in contracted relation to each other, means responsive to an external influence for releasing said parts for separation, and a check controlled mechanism for cooperation with said check, said check controlled mechanism embodying means for releasing said holding means and means forming a portion of said check controlled mechanism and being responsive to such relative motion for rendering said check-controlled mechanism effective for its intended purpose.

3. In a mechanical check, separable parts, means tending to separate such parts, latch means for holding such parts against separation and magnetically operable means for releasing said latch means.

4. In combination with a check including separable parts, means tending to separate such parts, means for holding said parts against separation, and magnetically operable means for rendering said holding means ineffective, a check controlled mechanism including a housing, a platform in said housing, means for conveying said check to said platform, magnetic means responsive to positioning said check on said platform for causing said magnetically operable means to function and means responsive to separation of said separable parts for rendering the said mechanism effective for its intended purpose and dumping said check from said platform.

5. In combination, a check including a plurality of parts movable with respect to each other, means for separating said parts, means for holding said parts together; a check controlled mechanism including means for rendering the holding means ineffective whereby said parts separate under the action of the separating means, and means responsive to separation of said parts for rendering the check controlled mechanism effective for its intended purpose.

6. A mechanical check for use in connection with a check controlled device, comprising, separable parts, means tending to separate such parts, means for holding such parts against separation and means for releasing said holding means.

7. The combination of a check constructed in a plurality of axially movable, separable, disk-shaped parts and a check controlled machine to be operated thereby, an element of said combination embodying means for causing relative motion of said parts axially of each other, and said check controlled machine embodying means for rendering said first means active and means responsive to axial motion of said separable parts for rendering said check controlled machine effective for its intended purpose.

8. As a new article of manufacture, a check including relatively movable parts and means for controlling the relative position of the parts, said last means including mechanism adapted to be operated by an external magnetic influence.

WILLIAM K. SCHAUWEKER.